Patented Feb. 6, 1934

1,946,004

UNITED STATES PATENT OFFICE 1,946,004

PROTECTED MOTION PICTURE FILM AND METHOD OF MAKING SAME

Lawrence L. Steele, Washington, D. C., assignor to The Essem Laboratories, Incorporated, Washington, D. C., a corporation of Maryland No Drawing. Application February 28, 1929
Serial No. 343,567

15 Claims. (Cl. 91—69)

This invention relates to protected motion picture film and method of treating film as well as coating such treated film.

An object of the invention is to provide a motion picture film which is highly resistant to scratching and has no tendency to curl, buckle, shrink or become brittle under the usual conditions incident to its use.

The invention has for a further object to provide a method of treating the usual developed motion picture film in such manner that the natural curling, buckling and shrinking tendency of such film is eliminated particularly when subjected to the heat evolved in the projection machine or when subjected to heat for drying purposes.

A further object of the invention is to so treat a developed picture film that it will retain its flexibility under temperature conditions incident to projection and over a greatly extended period of time during storage.

It is also an object of the invention to so treat the film that the surface thereof will not become marred by scratching due to handling and also due to wear and tear incident to its passage through the projection machine.

The usual motion picture film embodies a laminated structure comprising a foundation or backing sheet of a cellulosic nature such as pyroxylin or celluloid, and a gelatin layer thereon carrying the motion picture. The curling, buckling and shrinking tendency and loss of flexibility of the film are due chiefly to evaporation of moisture from the gelatin layer and it has heretofore been proposed to incorporate in the gelatin layer of the usual picture film hygroscopic substances to prevent such evaporation. Ordinary glycerin has been chiefly used for this purpose, although a combination of glycerin and other substances such as ethylene glycol has been proposed.

Many great disadvantages have followed from the treatment heretofore employed as above outlined. The present invention comprises the step of impregnating the gelatin layer of the film with a suitable quantity of a hygroscopic non-volatile ingredient which in addition to its other characteristics is a solvent for cellulose ester material such as pyroxylin, celluloid and nitro cellulose. The specific material preferably employed in the practice of this invention is a polyglycol and it has been found that diethylene glycol is particularly suitable for the purpose.

In practicing the present invention the gelatin side of the motion picture film is subjected to the action of a mixture of water, alcohol and diethylene glycol or other polyglycol, although the entire picture film may be immersed in the mixture. A mixture of 50% water, 25% alcohol and 25% diethylene glycol has been found to give eminently satisfactory results. According to the invention the film thus treated and then dried may be coated upon both sides or upon the gelatin side only with a cellulose ester composition having the property of drying relatively quickly and providing a flexible layer of extreme hardness and of high resistance to scratching and which at the same time gives a slippery surface to facilitate the passage of the film through the mechanism of the projection machine. This final coating preferably comprises nitro cellulose and a solvent such as butyl acetate together with a diluent and a plastisizer, although the plastisizer in some cases may be omitted. The preferred diluent is a mixture of denatured ethyl alcohol, toluol and butyl alcohol and preferably diethylene glycol is used as the plastisizer.

Diethylene glycol is a non-volatile hygroscopic substance having the property of acting as a solvent of cellulose esters and particularly nitro cellulose. By the use of this material incorporated in the gelatine layer a better bond is provided between the gelatin layer and the celluloid backing layer. Furthermore the solvent property of the diethylene glycol also provides greatly increased bonding between the gelatin and a final coating of cellulose ester material.

While it is contemplated that the film be treated in accordance with this invention after it has been developed and dried in the usual manner, it is also contemplated that the film be treated with diethylene glycol after the same has been completely developed and prior to the usual drying operation. By a treatment of the film at this point the subsequent necessary drying operation is greatly facilitated. The treated film may be more rapidly dried and subjected to a greatly increased drying temperature without any tendency of the film to shrink, curl or become brittle. Therefore the usual drying apparatus may be greatly reduced in length and a great saving thus accomplished.

A motion picture film treated with diethylene glycol as above described has many advantages over untreated film. Furthermore, such a treated film may be given a further coating of cellulose ester material and thereby produce a coated film having many properties and advantages which cannot be obtained by coating an untreated film or a film treated otherwise than in the manner prescribed by this invention.

A highly important advantage of a protected motion picture film made in accordance with the present invention lies in the fact that the use of such a film in a projection machine appreciably reduces the ever present fire hazard for the reason that the prescribed treatment materially reduces the flammability thereof and it is considered that such reduction is of the order of 25%.

What is claimed is:

1. A motion picture film having a polyglycol incorporated in the gelatin layer thereof.
2. A motion picture film having diethylene glycol incorporated in the gelatin layer thereof.
3. A motion picture film having a polyglycol incorporated in the gelatin layer thereof and provided with a relatively hard, flexible coating of cellulose ester material.
4. A motion picture film having diethylene glycol incorporated in the gelatin layer thereof and provided with a relatively hard, flexible coating of cellulose ester material.
5. A method of treating motion picture film comprising incorporating a polyglycol in the gelatin layer thereof.
6. A method of treating motion picture film comprising incorporating diethylene glycol in the gelatin layer thereof.
7. A method of treating motion picture film comprising applying a polyglycol to the gelatin layer thereof.
8. A method of treating motion picture film comprising applying diethylene glycol to the gelatin layer thereof.
9. A method of treating motion picture film comprising applying a polyglycol and water to the gelatin layer thereof.
10. A method of treating motion picture film comprising applying diethylene glycol and water to the gelatin layer thereof.
11. A method of treating motion picture film comprising applying a mixture of polyglycol and alcohol to the gelatin layer thereof.
12. A method of treating motion picture film comprising applying a mixture of diethylene glycol and alcohol to the gelatin layer thereof.
13. A method of treating motion picture film comprising applying a mixture of polyglycol, alcohol and water to the gelatin layer thereof.
14. A method of treating motion picture film comprising applying a mixture of diethylene glycol, alcohol and water to the gelatin layer thereof.
15. A photographic picture film having a polyglycol incorporated in the gelatin layer thereof and provided with a relatively hard, flexible coating of cellulose ester material.

LAWRENCE L. STEELE.